UNITED STATES PATENT OFFICE.

MORITZ ULRICH AND JOHANN BAMMANN, OF ELBERFELD, GERMANY, ASSIGNORS TO THE FARBENFABRIKEN, VORMALS FR. BAYER & CO., OF SAME PLACE.

AZO DYE.

SPECIFICATION forming part of Letters Patent No. 524,005, dated August 7, 1894.

Application filed April 20, 1894. Serial No. 508,353. (Specimens.) Patented in Germany January 24, 1893, No. 73,251; in France February 22, 1893, No. 228,125, and in Italy March 25, 1893, XXXVII, 33,657, LXVI, 88.

*To all whom it may concern:*

Be it known that we, MORITZ ULRICH and JOHANN BAMMANN, chemists, doctors of philosophy, residing at Elberfeld, Prussia, Germany, subjects of the Emperor of Germany, assignors to the FARBENFABRIKEN, VORMALS FR. BAYER & CO., of Elberfeld, have invented a new and useful Improvement in the Manufacture of Bluish-Red Substantive Azo Dyes, (for which the aforesaid FARBENFABRIKEN, VORMALS FR. BAYER & CO. has already obtained Letters Patent in Germany, No. 73,251, dated January 24, 1893; in France, No. 228,125, dated February 22, 1893, and in Italy, Vol. XXXVII, No. 33,657, Vol. LXVI, 88, dated March 25, 1893,) and we do hereby declare the following to be a full, clear, and exact description of our invention.

Our invention relates to the production of a bluish-red coloring-matter dyeing unmordanted cotton directly and resulting from the action of one molecular proportion of diazotized dehydrothiotoluidin (or diazotized dehydrothiometaxylidin, or dehydrothiopseudocumidin) with one molecular proportion of $alpha_1$ ethoxy-$alpha_4$-naphthol-$beta_2$ $beta_3$-disulfo-acid or an alkaline salt thereof. The last mentioned $alpha_1$-ethoxy-$alpha_4$-naphthol-$beta_2$ $beta_3$-disulfoacid has the following formula:

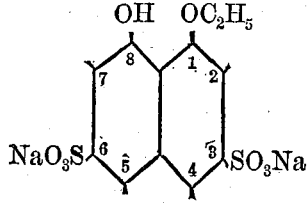

and is obtained, for instance, from dioxynaphthalene disulfo acid ($OH:SO_3H:SO_3H:OH = 1:3:6:8$) by alkylating the same in a suitable manner with ethyl bromid or the like.

In carrying out our invention practically we proceed as follows: First we prepare the above named $alpha_1$-ethoxy-$alpha_4$-naphthol-$beta_2$ $beta_3$-disulfo acid by heating one molecular proportion of the said sodium salt of $alpha_1$ $alpha_4$-dihydroxynaphthalene-$beta_2$ $beta_3$-disulfonic acid (socalled chromotrop acid) with lime, (or the like) in order to convert it into the basic salt. After filtering, the resulting solution is mixed with one molecular proportion of ethylbromid and the mixture so formed is heated by means of a salt bath during say eight hours at about 105° centigrade. The $alpha_1$-ethoxy-$alpha_4$-naphthol-$beta_2$ $beta_3$-disulfo acid thus produced, separates from the liquid while cooling in the form of its sodium-calcium salt, the unaltered chromotrop acid remaining dissolved. After filtering and pressing this sodium-calcium salt is dissolved in a sufficient quantity of hot water and after precipitating the calcium by means of sodium carbonate, filtered again. While cooling the sodium salt of this $alpha_1$-ethoxy-$alpha_4$-naphthol $beta_2$ $beta_3$-disulfo acid separates in needles, which are filtered off, pressed and dried.

In place of ethylbromid, the corresponding quantities of other alkylhaloids, as for example ethylchloride, or ethylsulfate, or similar or analogous ethylating agents can be used in the above process.

If ethylsulfate or analogous alkylsulfates are employed the temperature must be raised to from about 170° to 180° centigrade. In this manner acids are obtained, which correspond with the general formula

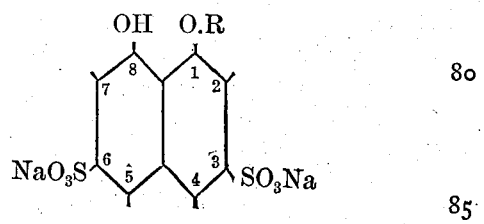

(wherein R signifies any fatty radicle).

In order to prepare the dye-stuff, twenty-four parts, by weight, of dehydrothioparatoluidin (or the corresponding quantity of dehydrothiometaxylidin, dehydrothiopseudoxumidin) after being converted into the sulfate are diazotized at from about 30° to 40° centigrade by means of seven parts, by weight, of sodium nitrite and sixteen parts, by weight, of hydrochloric acid (20° Baumé). The resulting diazo compound is allowed to flow into a solution, which is prepared by dissolving 39.2 parts, by weight, of the sodium salt of $alpha_1$-ethoxy-$alpha_4$-naphthol-$beta_2$ beta$_3$-disulfo acid in a sufficient quantity of water and subsequently adding fifteen parts, by weight, of sodium carbonate (Na$_2$CO$_3$). The formation of the dye-stuff begins and is complete after a short time. The finished dye-stuff is isolated by salting out, filtering off, and pressing. If necessary it may be purified by redissolving and isolating again in the well known manner.

The dye, which corresponds with the formula:

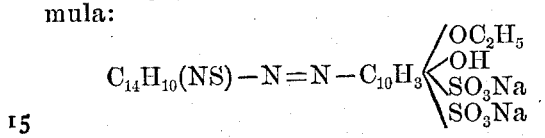

forms, when dried and pulverized, a brownish-red powder easily soluble in water with a bluish-red color, which is changed into yellowish-red on the addition of a small quantity of any mineral acid. By concentrated sulfuric acid it is dissolved with a blue color which turns at first into violet when ice-water is added, yellowish-red flakes being finally separated, which dissolve again on the addition of a great excess of water to the sulfuric acid mixture. The dye-stuff is soluble in alcohol with a red color. It produces on unmordanted cotton clear bluish-red shades very fast against the action of alkali, acid and light.

If instead of dehydrothio-paratoluidin corresponding quantities of dehydrothio-metaxylidin or dehydrothiopseudocumidin are used in the above process, dye-stuffs are obtained which produce shades somewhat more bluish than those obtained by means of the aforesaid coloring-matter resulting from dehydrothioparatoluidin.

When in the claims of this specification we refer to "diazotized dehydrothioparatoluidin" we mean to express thereby as well the described equivalents diazotized dehydrothiometaxylidin, or diazotized dehydrothiopseudocumidin.

Having now described our invention and in what manner the same is to be performed, what we claim as new, and desire to secure by Letters Patent, is—

1. The process for the production of substantive dye resulting from the action of one molecular proportion of diazotized dehydrothioparatoluidin on one molecular proportion of alpha$_1$ alkyloxyalpha$_4$-naphthol-beta$_2$beta$_3$-disulfo acid or an alkaline salt thereof substantially as described.

2. As a new article of manufacture the dye-stuff producible from one molecular proportion of diazotized dehydrothioparatoluidin and one molecular proportion of alpha$_1$-ethoxy-alpha$_4$ naphthol-beta$_2$ beta$_3$ disulfo acid, which dye when dehydrothioparatoluidin is employed corresponds with the formula:

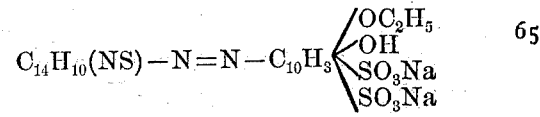

forming a brownish-red powder, easily soluble in water with a bluish red color, soluble in alcohol with a red color, soluble in concentrated sulfuric acid (66° Baumé) with a blue color, which solution turns when mixed with ice water into violet yellowish-red flakes being finally separated on the addition of a great excess of water, producing on unmordanted cotton clear bluish-red shades very fast against the action of alkali, acid and light.

In testimony whereof we have signed our names in the presence of two subscribing witnesses.

MORITZ ULRICH.
JOHANN BAMMANN.

Witnesses:
WILLIAM ESSENWEIN,
T. H. STRAUSS.